(12) United States Patent
Hekstra et al.

(10) Patent No.: US 10,237,056 B2
(45) Date of Patent: Mar. 19, 2019

(54) MULTI-PULSE COMMUNICATION USING SPREADING SEQUENCES

(71) Applicant: NXP B.V., Eindhoven (NL)

(72) Inventors: Andries Hekstra, Eindhoven (NL); Stefan Drude, Waalre (NL); Frank Leong, Veldhoven (NL); Arie Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 754 days.

(21) Appl. No.: 14/683,367

(22) Filed: Apr. 10, 2015

(65) Prior Publication Data
US 2016/0302074 A1   Oct. 13, 2016

(51) Int. Cl.
| | | |
|---|---|---|
| H04K 1/00 | (2006.01) | |
| H04B 1/692 | (2011.01) | |
| H04B 1/7163 | (2011.01) | |
| H04B 10/116 | (2013.01) | |
| H04L 9/00 | (2006.01) | |
| H04L 29/06 | (2006.01) | |

(52) U.S. Cl.
CPC .............. *H04L 9/00* (2013.01); *H04B 1/692* (2013.01); *H04K 1/00* (2013.01); *H04L 63/0435* (2013.01); *H04B 1/71632* (2013.01); *H04B 10/116* (2013.01); *H04B 2201/70715* (2013.01); *H04L 63/1466* (2013.01)

(58) Field of Classification Search
CPC ......... H04L 5/0017–5/0021; H04K 1/00–1/10; H04B 1/69
See application file for complete search history.

(56) References Cited

U.S. PATENT DOCUMENTS

| | | | |
|---|---|---|---|
| 8,358,613 B1 * | 1/2013 | Giallorenzi | H04W 12/02 370/328 |
| 2004/0196926 A1 | 10/2004 | Chien | |
| 2005/0147245 A1 | 7/2005 | Hassan et al. | |
| 2010/0157907 A1 | 6/2010 | Nasrabadi et al. | |
| 2010/0211787 A1 * | 8/2010 | Bukshpun | H04L 9/0838 713/170 |
| 2013/0235908 A1 | 9/2013 | Zhang | |
| 2013/0272344 A1 | 10/2013 | Lakkis | |

OTHER PUBLICATIONS

AMS AS3932 Data Sheet, 3D Low Frequency Wakeup Receiver, Nov. 5, 2014.
Extended European Search Report for Patent Appln. No. 16164432.3 (dated Sep. 7, 2016).

* cited by examiner

*Primary Examiner* — Daniel B Potratz

(57) ABSTRACT

Various exemplary embodiments relate to a method of communicating by a transmitter. Embodiments of the method may include creating information to be used by a receiver to define a spreading sequence for a subsequent packet, coding the information into a current communications packet, and transmitting the current communications packet.

18 Claims, 13 Drawing Sheets

MULTI-PULSE COMMUNICATION USING SPREADING SEQUENCES

TECHNICAL FIELD

Various exemplary embodiments disclosed herein relate generally to multi-pulse communication using spreading sequences.

In Direct Sequence Spread Spectrum (DSSS) and Ultra-wideband (UWB) communication, an information bit may be encoded through antipodal signaling into a sequence of pulses. In situations where the transmitted signal is observed at a very high Signal to Noise Ratio (SNR) by an attacker, the first pulse of the multi-pulse sequence may give away the polarity of the modulated spreading sequence. The attacker may then reproduce and transmit the remainder of this spreading codeword with a negative delay, except for some initial part that may be neglected in the bit detection operation of the receiver.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a device of communicating by a transmitter. The method may include: creating information to be used by a receiver to define a spreading sequence for a subsequent packet; coding the information into a current communications packet; and transmitting the current communications packet.

In some embodiments the spreading sequence that may be used for the reception of a next radio packet is contained in an encrypted part of the current communications packet.

In some embodiments the spreading sequence is communicated between transmitter and receiver through a cryptographic channel and varied per radio packet.

Some embodiments further include transmitting two spreading sequences with the current communications packet.

In some embodiments the spreading sequence is computed by the receiver in dependence on information shared through a cryptographic channel with the transmitter.

Some embodiments further include storing the same table of allowed spreading sequences at the transmitter and the receiver.

Some embodiments may further include transmitting information through a cryptographic channel to be used by a receiver, wherein the receiver uses the transmitted information as an index in a lookup table to determine a spreading codeword.

Some embodiments may further include using a secret key at the receiver to derive the spreading sequence, where the secret key is one that is shared with the transmitter.

Some embodiments may further include deriving the spreading sequence in dependence on secret key information shared between the transmitter and a receiver, as well as a counter.

Various embodiments relate to a method of communicating by a receiver, the method including receiving a current communications packet; decoding information, created by a transmitter, in the current communications packet; identifying in the information a definition of a spreading sequence for a subsequent packet.

Some embodiments include the spreading sequence to be used for a next radio packet being contained in an encrypted part of the current communications packet.

Some embodiments may further include the spreading sequence being communicated between transmitter and receiver through a cryptographic channel and varied per radio packet.

Some embodiments may further include receiving two spreading sequences with the current communications packet.

Some embodiments may further include the spreading sequence being computed by the receiver in dependence on information shared through a cryptographic channel with the transmitter.

Some embodiments may further include storing the same table of allowed spreading sequences at the transmitter and the receiver.

Some embodiments may further include receiving information through a cryptographic channel transmitted by the transmitter, wherein the receiver uses the transmitted information as an index in a lookup table to determine a spreading codeword.

Some embodiments may further include using a secret key at the receiver to derive the spreading sequence, where the secret key is one that is shared with the transmitter.

Some embodiments may further include deriving the spreading sequence in dependence on secret key information shared between the transmitter and a receiver, as well as a counter.

BRIEF DESCRIPTION OF THE DRAWINGS

In order to better understand various exemplary embodiments, reference is made to the accompanying drawings, wherein.

DETAILED DESCRIPTION

Figure 1:
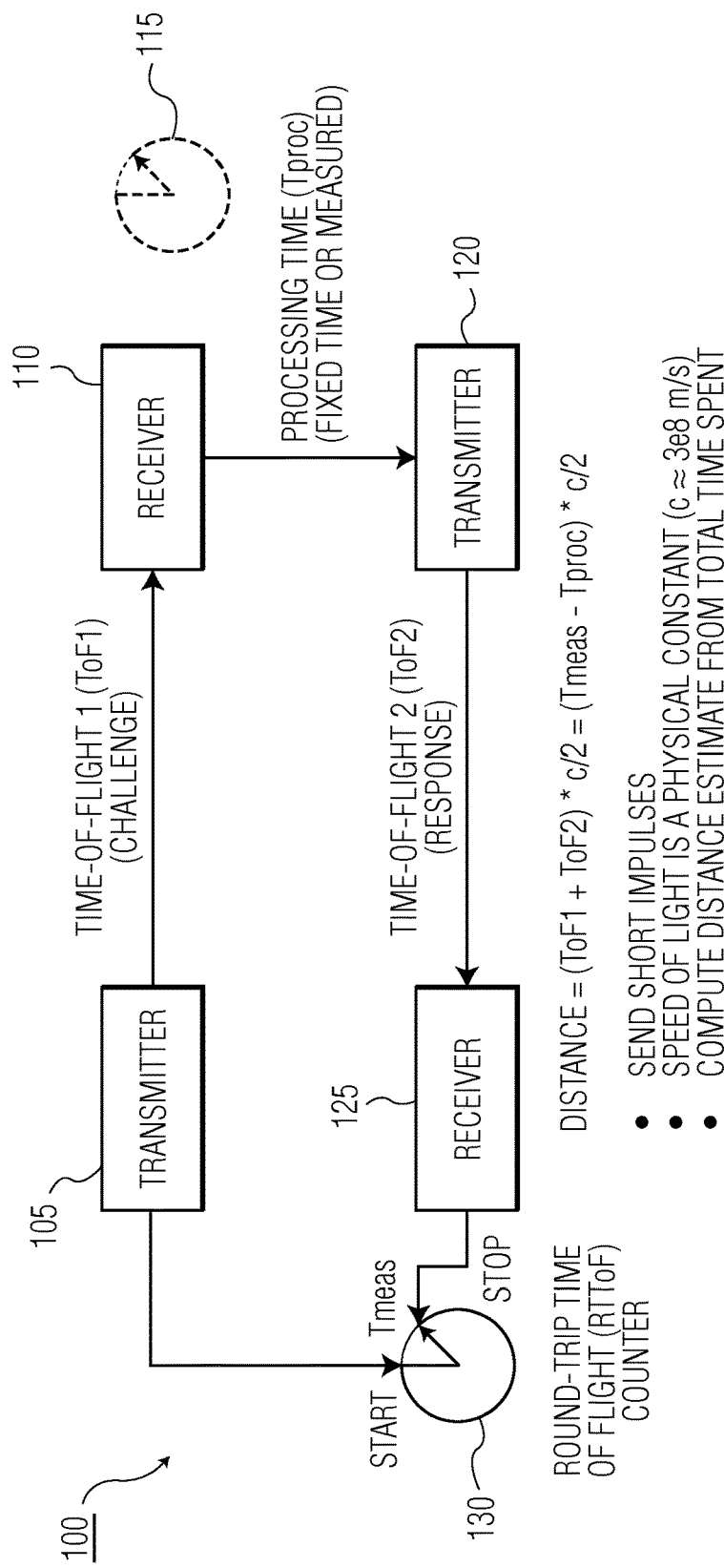
FIG. 1 illustrates a ranging technique.

In some embodiments described herein, a spreading sequence may be randomly chosen out of a set of acceptable spreading sequences in dependence on secret information that may be shared between the legitimate transmitter and receiver. This may complicate the task for an attacker to predict the remainder of a multi-pulse sequence from the polarity of its first pulse(s).

Referring now to the drawings, in which like numerals refer to like components or steps, there are disclosed broad aspects of various exemplary embodiments.

FIG. 1 illustrates a Radio Frequency ranging technique 100. Radio frequency ranging technique 100 may include transmitter 105, receiver 110, processing time 115, transmitter 120, receiver 125 and round trip time of flight counter 130. A Radio Frequency (RF) ranging system may employ a Time-of-Flight principle to determine the distance between two objects or markers on objects. Usually, a transceiver's transmitter sends out a waveform (commonly a chirp or a pulse), which is either reflected by an object or retransmitted by a second transceiver. Based on the amount of time it takes for the reflection or retransmission to reach the originating transceiver's receiver, the distance between the objects can be calculated. FIG. 1 illustrates an RF ranging system based on two transceivers. Embodiments of the present invention may apply to modulated radio waves, modulated sound waves or modulated light waves (LiFi), for example.

Embodiments include combined ranging and communication systems that convey a message or information bit through a sequence of pulses that all convey the same message bit. Examples of such communication systems include DSSS systems. However, also in the payload part of the radio packets inside the IEEE 802.15.4a UWB standard, sequences of back-to-back pulses may be used. In this standard, the polarity of subsequent pulses is scrambled through a spreading sequence.

Figure 2:
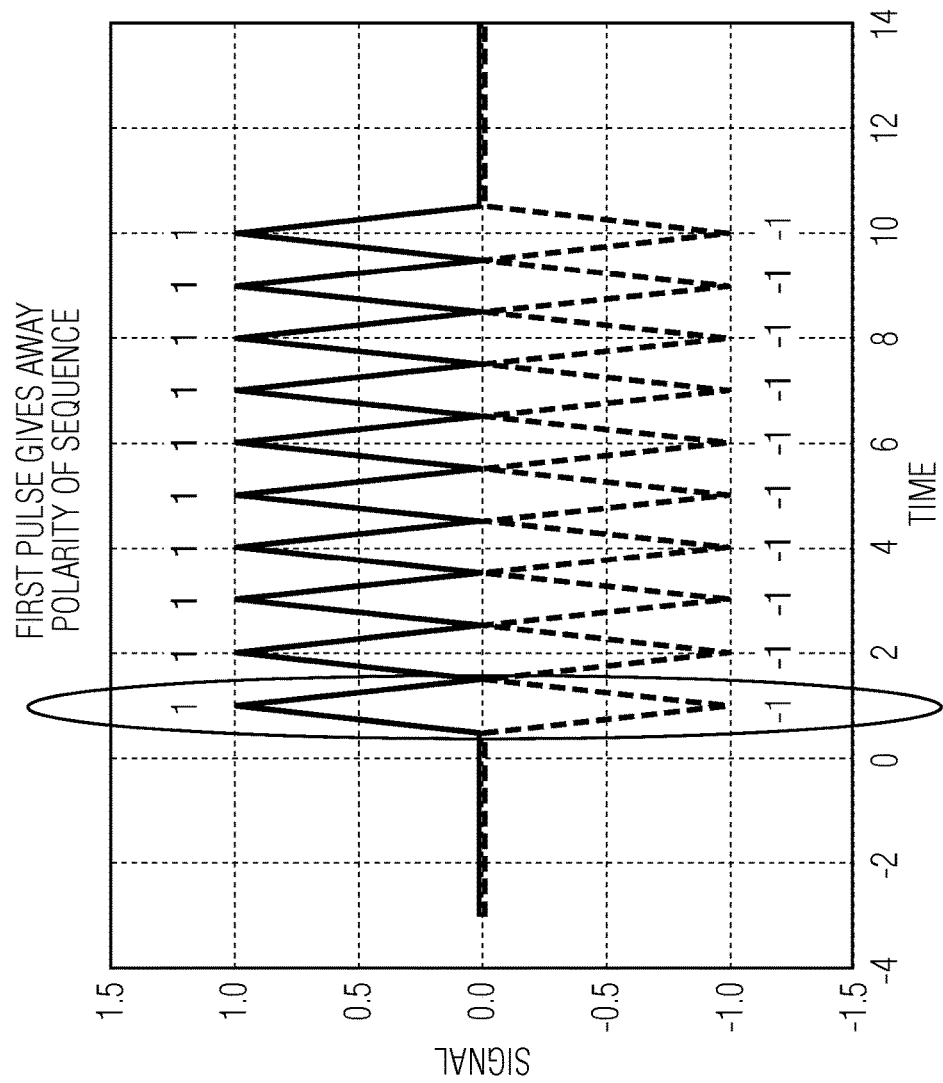
FIG. 2 illustrates a redundant spread spectrum communication.

FIG. 2 illustrates a redundant spread spectrum communication. In FIG. 2 is demonstrated an example of a multi-pulse sequence that uses plain repetition of the first pulse. Depending on the message bit that is to be transmitted a sequence of 10 pulses with amplitudes +1, or 10 pulses with amplitude −1 are transmitted. Other pulse shapes than the triangular shape used in FIG. 2 may be employed. FIG. 2 demonstrates two possible antipodal versions of the multitude of pulses. The polarity of the first pulse may give away the polarity of the entire spreading codeword to an eavesdropper.

Embodiments of the present invention may be directed to secure communication and ranging. An eavesdropper may be listening in on the communication between a transmitter and a receiver that both employ multi-pulse based communication. From FIG. 2 it may be apparent, that when the eavesdropper observes the first pulse with a high signal to noise ratio, from the polarity of the first pulse, the attacker may predict the remainder of the multi-pulse sequence.

Figure 3:
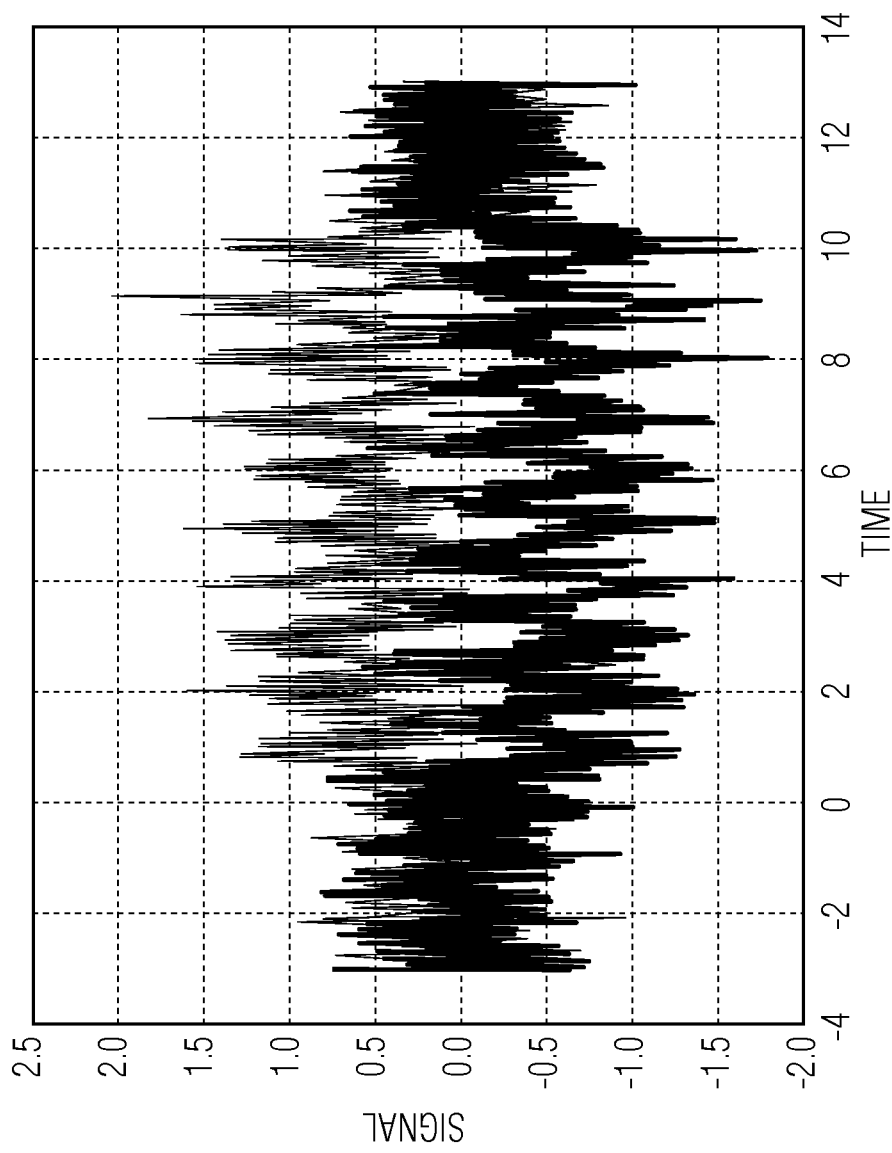
FIG. 3 illustrates two possible antipodal multi-pulse signals with Gaussian noise added onto these signals.

FIG. 3 illustrates two possible antipodal multi-pulse signals with Gaussian noise added onto these signals. As demonstrated in FIG. 3 the received signal-to-noise ratio per pulse may be low. The reason that the information contained in a message bit is repeated over a number of channel pulses is to allow reception of the signal at low signal-to-noise ratio. However, a receiver may combine the signal-to-noise ratios of the individual pulses in a sequence in order to arrive at a much higher detection signal-to-noise ratio that allows reception of the encoded polarity or message bit with acceptable reliability. Such reliable communication at or below the noise level is one of the advantages of DSSS and UWB communication and an important target condition. In FIG. 3, when the signal of FIG. 1 is received at low signal-to-noise ratio, due to the repetition, the information bit may still be detected with an acceptable reliability.

Figure 4:
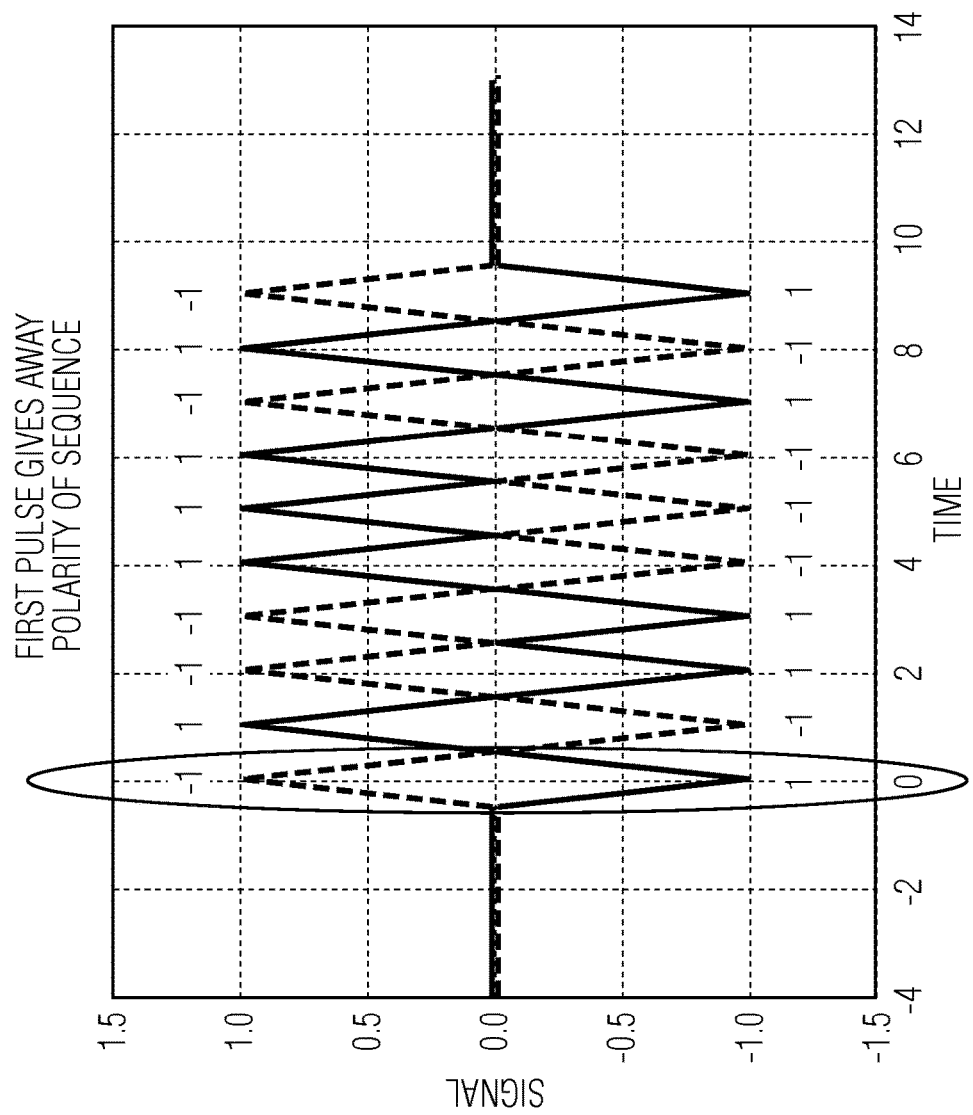
FIG. 4 illustrates two non-trivial antipodal multi-pulse signals.

FIG. 4 illustrates two non-trivial antipodal multi-pulse signals. For the case of plain repetition of a pulse as in FIG. 2 or 3, in the frequency domain, all signal energy is concentrated at the low frequency range. It is the intention of DSSS and UWB communication to distribute this signal energy over a much larger bandwidth. This is achieved through the use of non-trivial spreading sequences as in FIG. 4. In this example, depending on the value of a message information bit, either the sequence of amplitudes "−1 1 −1 −1 1 1 1 −1 1 −1" or the complementary sequence of amplitudes "1 −1 1 1 −1 −1 −1 1 −1 1" is selected. This is a case of antipodal signaling. That is each of the pulses may be subject to Binary Phase Shift Keying (BPSK), for example, in the case of UWB communication. Alternatively, for each of the pulses in a multi-pulse sequence, On Off Keying (OOK) may be used. The spectral characteristics of the transmitted signal may be improved by the use of pseudo-random spreading sequences. Such spreading sequences may be designed through mathematical methods, or found through computer search algorithms that implement certain search criteria for a desired sequence. Additional improvements of the spectral properties may be attained through the selection of the pulse shape. FIG. 4 also illustrates how the sign of the first pulse may still give away the shape of the signal for the remainder of the entire multi-pulse sequence to an attacker. For ranging, the so called ambiguity function of the spreading sequence may be relevant, for example, favoring Barker or Gold sequences.

For a non-trivial spreading sequence, which for example is specified by a communication standard, the polarity of the first pulse gives away the shape of the remaining multi-pulse sequence. FIG. 4 shows the case in which a sequence or burst of pulses is separated from other bursts through an amount of idle time during which an all zeros signal is transmitted. This may be exemplary of IEEE802.5.14a UWB modulation, for example. In case of DSSS modulation, successive message bits may be modulated into consecutive pulse sequences without idle time in between these successive spreading codewords.

Figure 5:
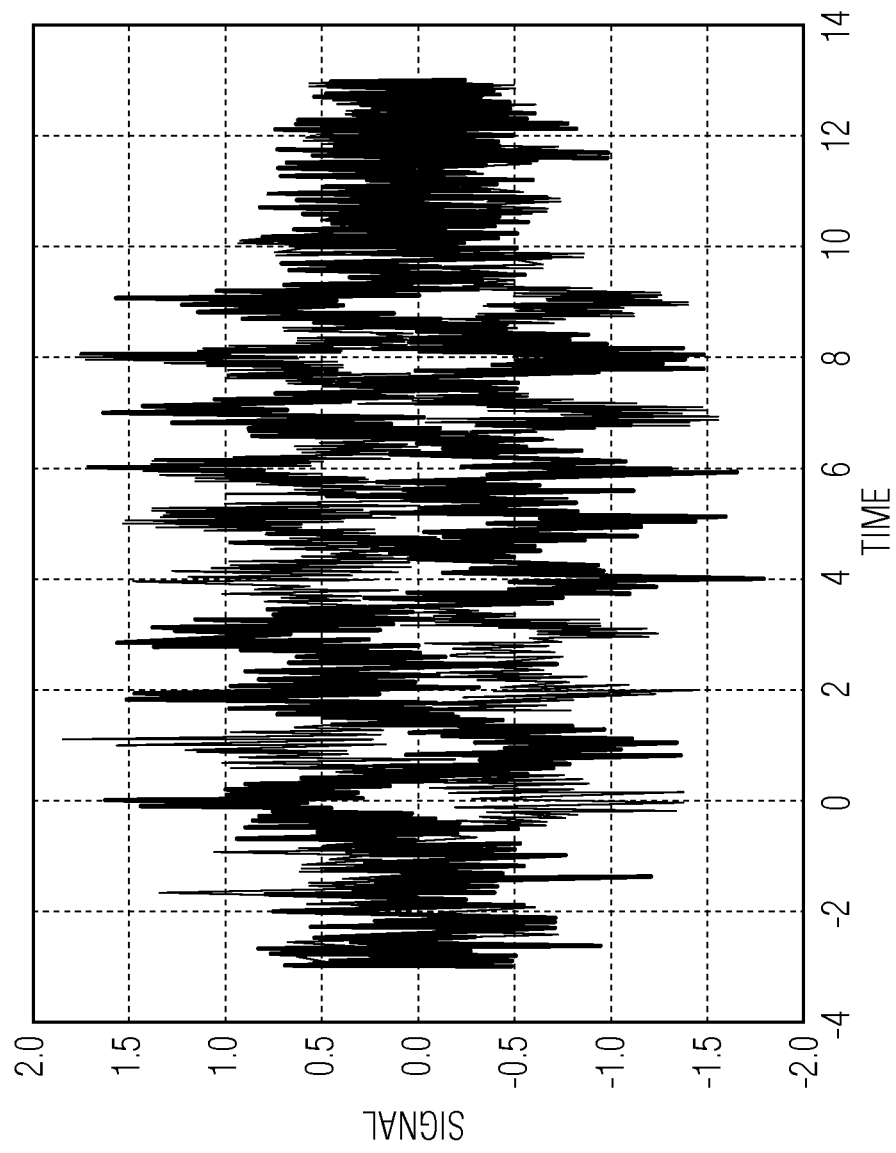
FIG. 5 illustrates the multi-pulse signals of FIG. 4 added with Gaussian noise.

FIG. 5 illustrates the multi-pulse signal of FIG. 4 to which noise is added. At a low signal-to-noise ratio the information bit may still be detected with acceptable reliability due to the repetition inherent to the use of a multitude of pulses similarly to FIG. 3. Also in the case of non-trivial spreading sequences, multi-pulse modulation through repetition of information may be well suited for reception of signals at low signal-to-noise ratio. Combination of the information in all received pulses per multi-pulse sequence still allows reliable detection of message bits at a meaningful operating distance between transmitter and receiver.

Figure 6:
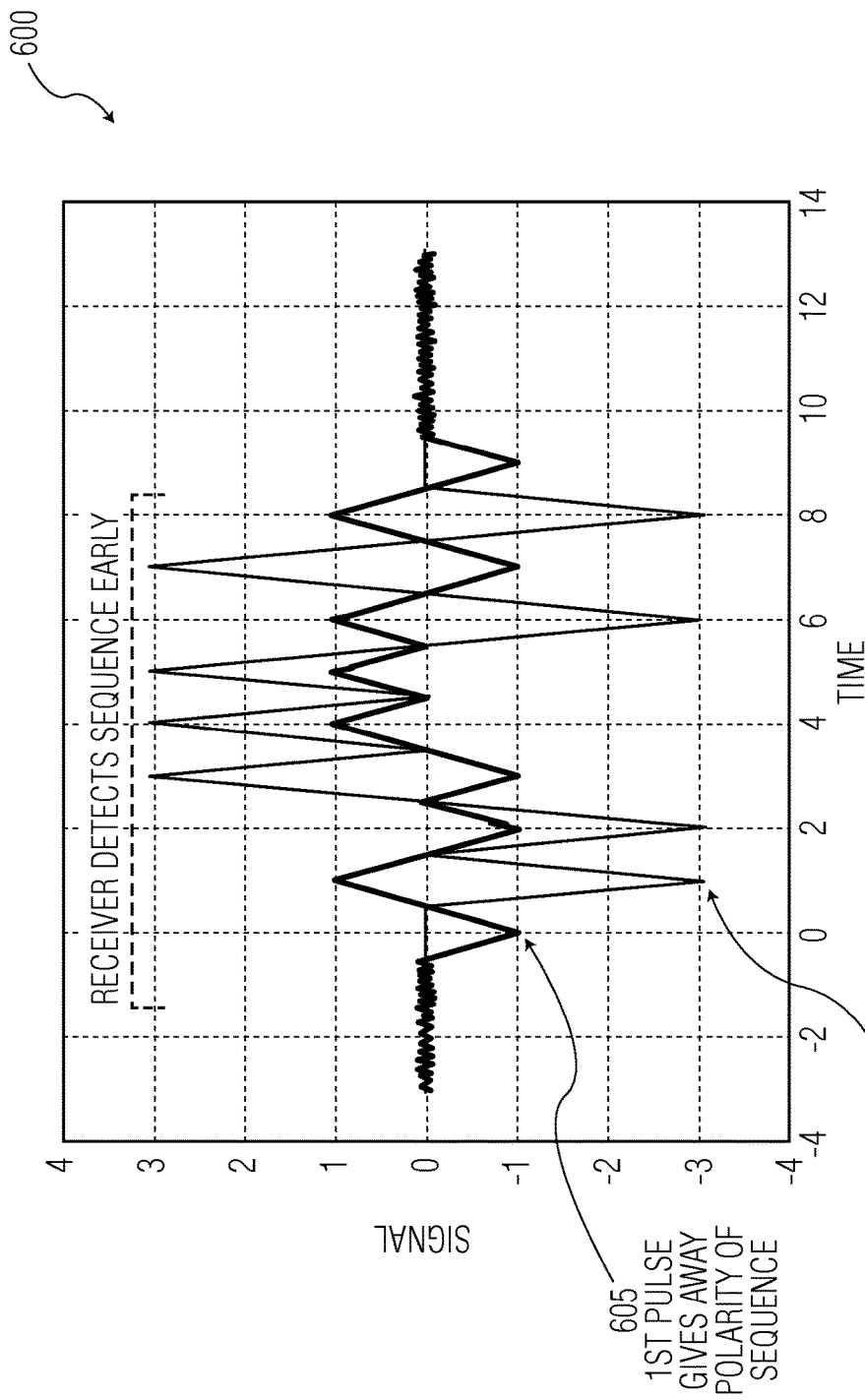
FIG. 6 illustrates an attacked signal.

FIG. 6 illustrates an attacked signal scenario 600. Attacked signal scenario 600 may include an intended signal 605 and attacker signal 610. A receiver of an attacker of the ranging system may be closer to the transmit antenna than the receiver of the legitimate user, or use more expensive, higher quality receiver antennas or electronics, and in this way observe the transmitted pulse based signal at a much higher signal to noise ratio (SNR) than the intended receiver. At a sufficiently high SNR, the attacker may detect the presence and/or absence of a pulse in case of OOK modulation, or the polarity of a pulse in case of BPSK, by means of the first pulse of a multi-pulse sequence. An attacker of a secure ranging system based on pulse based communication may not comply with official bandwidth and/or transmit power regulations, and may superimpose a higher energy pulse, such as attacker signal 610, of which the leading edge has been cut, and that immediately starts with the main pulse body that the receiver is looking for in its detection scheme. Through this negative delay of this superimposed pulse, the attacker may successfully shorten the round trip delay the ranging system is measuring, and the legitimate receiver will bit-detect the correct bit sequence as if transmitted by the legitimate transmitter (these bits may be used for checking the security), albeit with a reduced transmission delay.

When a pseudo-random spreading sequence may be known to an eavesdropper, the polarity of the multi-pulse sequence follows from the polarity of the first pulse, provided this first chip is received at high signal-to-noise ratio. This may allow the attacker to retransmit an amplified version of the large remaining part of the multi-pulse sequence with a negative delay.

In case of automotive Passive Keyless Entry (PKE), when the secure ranging system measures a smaller distance between the car and the car key due to attacker activity, the doors of the car may be unlocked and the car may be stolen. With such a possible reward, the attacker may be willing to spend what it takes to attack such a system. Also in secure payment systems that employ a secure ranging subsystem to block financial transactions when the distance between an NFC equipped smart card and an NFC reader exceeds a specified distance, the blocking of transactions may be avoided by shortening the measured distance through a negative delay. The possibility that an attacker observes the signal at a higher SNR than the legitimate user undermines the security of the application.

In many applications one may speak of short range detection rather than range measurement as the ranging system may only need to answer the question whether or not the distance between the transmitter and receiver is larger or smaller than a given threshold, for example 2 meters. The secure ranging system may then have a binary outcome instead of a pseudo analogue distance value.

Embodiments may vary the spreading sequence that is used for the communication during a communication, where the choice of spreading sequence is shared between a transmitter and a receiver through a secure means which may not be eavesdropped. In that case, an attacker needs to estimate the first pulse(s) of a portion of the communication with high reliability, but in addition needs to guess the spreading sequence, in order to predict the remainder of the spreading codeword. This may complicate the task of the attacker, and limits their chance of successfully forging the range measurement through the emission of information sent by the legitimate transmitter at a negative delay.

Figure 7:
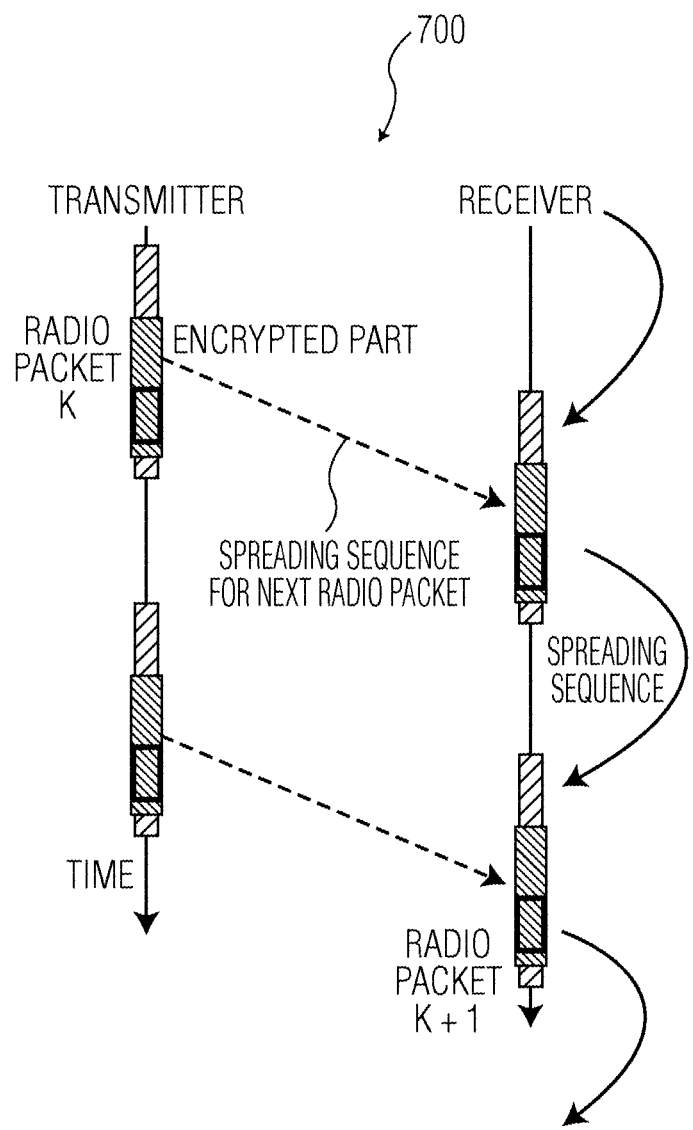
FIG. 7 illustrates an embodiment using encrypted spreading sequence.

FIG. 7 illustrates an embodiment using an encrypted spreading sequence 700. In embodiment 700, the encrypted part of radio packets may contain the spreading sequence that the receiver should use for the bit detection of the subsequent radio packet. In embodiment 700, a spreading sequence may be communicated between transmitter and receiver through cryptographic channel and varied per radio packet. In this embodiment, one may assume that transmitter and receiver employ the same spreading sequence over the duration of a radio packet. In case of bidirectional communication between two transceivers, different spreading sequences may be used in the opposite directions of the communication. The spreading sequence to be used for the reception of the next radio packet may be contained in an encrypted part of the current radio packet. In case of starting up of the communication, or loss of communication and later resuming communication, the transmitter and receiver must agree, for example, on the use of some default spreading sequence. In that case, an attacker may be required to eavesdrop over the entire duration of the communication in order to have a chance to be successful. In embodiment 700, the spreading sequence may be derived by means of a random number generator, noise or pseudo-random noise. The encryption used may use secret or public key cryptography.

Figure 8:
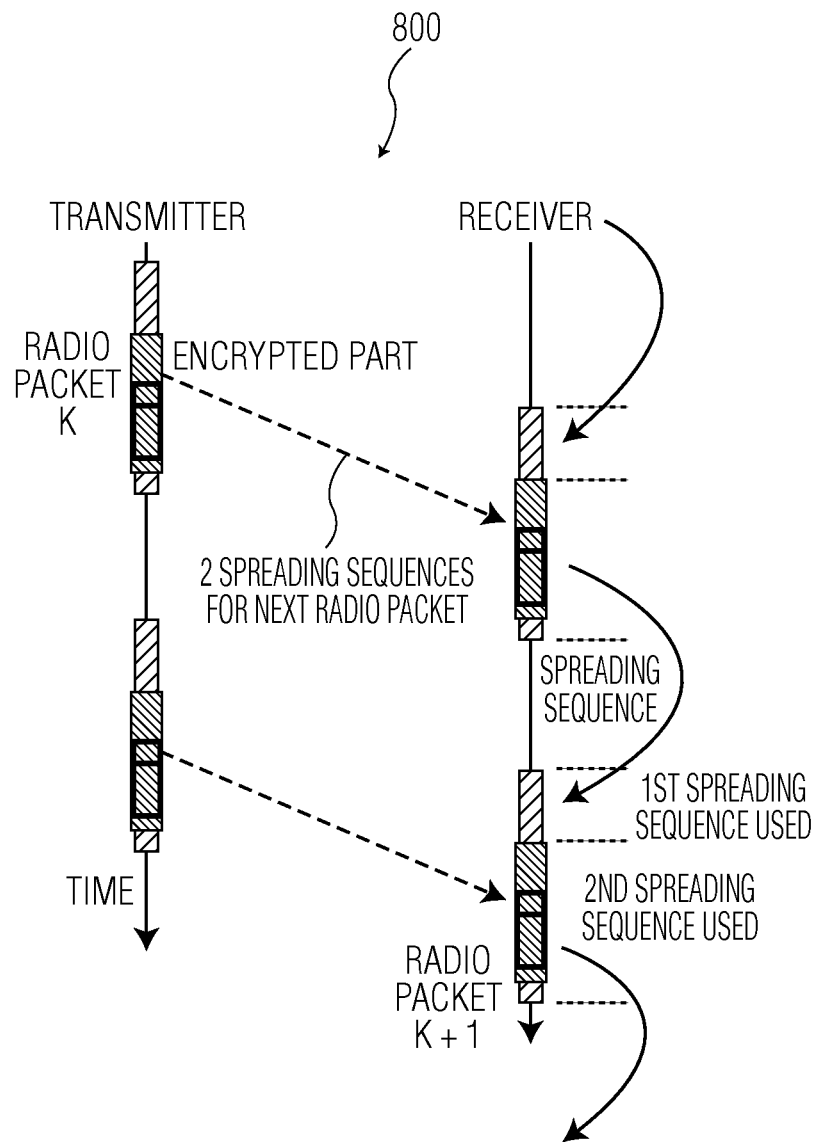
FIG. 8 illustrates an embodiment varying a spreading sequence.

FIG. 8 illustrates an embodiment varying a spreading sequence 800. In embodiment 800, the spreading sequence may be varied also within a radio packet, or across a number of subsequent radio packets. In embodiment 800, the spreading sequence may be communicated between transmitter and receiver through cryptographic channel and varied per frame of the communication data structure.

When radio packets in embodiment 700 consist of a relatively large number of spreading codewords, an attacker may gradually learn the spreading codeword during the reception of a radio packet. In that case, the security of the ranging operation may be enhanced, for example, by the use of a first spreading sequence for the first half of the subsequent radio packet, and a second spreading sequence for the second half of the subsequent radio packet. More generally, the radio packet may use at least one, two, three spreading sequences, etc. These spreading sequences may apply to parts of a radio packet that are equal in length. Alternatively, the spreading sequence may be changed more often in parts of the radio packet that are more vital to protect against attack by an eavesdropper who wants to manipulate the range measurement, such as the challenge and response fields in case of mutual authentication schemes, or encrypted fields of the radio packet.

As a special case, two transceivers may communicate with each other and make the frequency of changing the spreading sequence adaptive to estimates of the local signal to noise ratio, preliminary detection of attacker scenarios, or the distance between the transceivers.

In case multiple spreading sequences are transmitted per radio packet, it may be advantageous to limit the length of such spreading sequences. As a special case, one may also consider the use of spreading codes of different lengths. For instance, longer spreading sequences may be used to communicate parts of a radio packet that have higher importance for the application at hand with greater reliability in the presence of channel noise. Embodiment 800 illustrates the use of 2 spreading sequences conveyed through radio packet k, these sequences being of different length during the reception of radio packet k+1.

As a further special case, one may increase the delay between the reception of a spreading sequence and its use for the reception of a subsequent radio packet. For instance, the spreading sequence conveyed by means of radio packet k to the receiver, may be used for the reception of radio packet k+2, and so on.

Furthermore, in case of bidirectional communication, not only may the transmitter choose the spreading sequence used in the communication, but in case of 2 transceivers, that both have a transmitting and a receiving end, the spreading sequences in both directions may be chosen by the same transceiver. For instance, one receiver may have more computational, data storage, or energy storage to power the necessary electronics, and the means to choose and provide the spreading sequences may be provided by one of the two transceivers at a lower cost when compared with the other transceiver. Alternatively, a receiver may request the use of a particular spreading sequence in an upcoming radio packet through its uplink to the transmitter, for example, in the case of a low battery level.

In another embodiment, when the radio packets comprise relatively few message bits, and, hence, short spreading codewords are used, a small number of successive radio packets may share the use of a same spreading sequence. Such sharing may limit the overhead cost involved in the use of a time-varying spreading sequence. Relevant costs may include computational cost, integrated circuit area, or power consumption or communication time.

Figure 9:
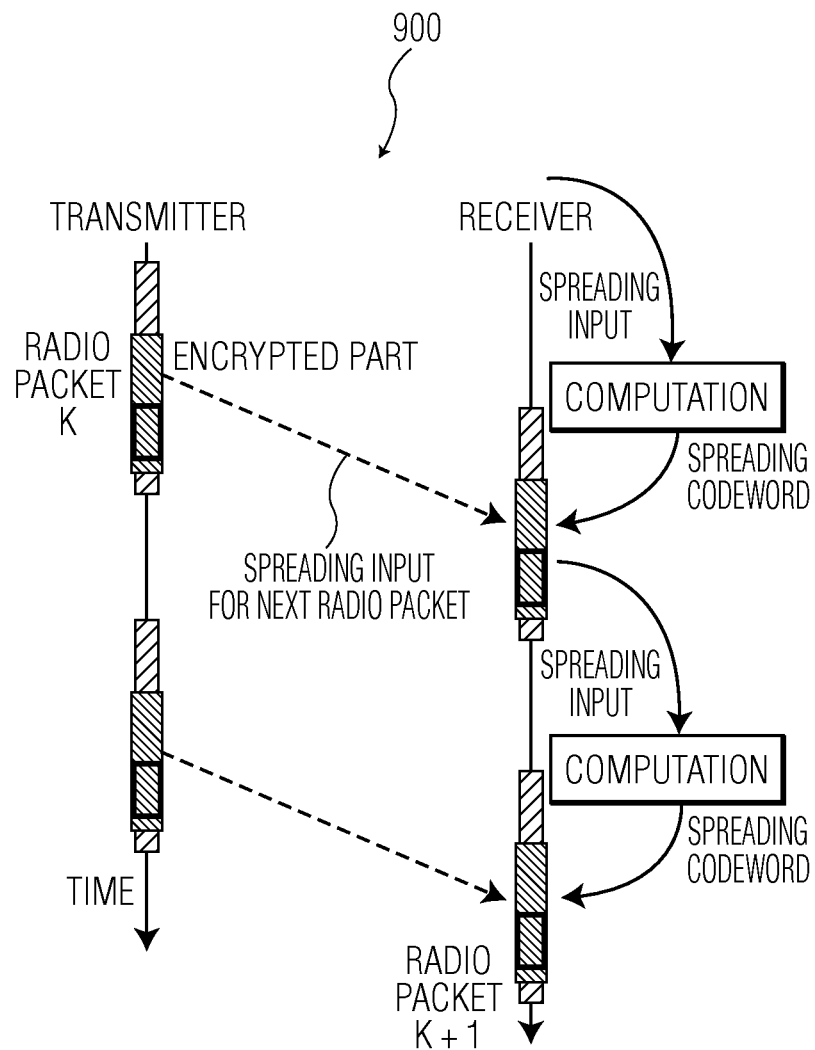
FIG. 9 illustrates an embodiment using a spreading sequence computed by transmitter and receiver.

FIG. 9 illustrates an embodiment using a spreading sequence computed by transmitter and receiver 900. In embodiment 900, the spreading codeword may be defined through the transmission of an input to a computation unit which may produce the spreading codeword from one or more inputs conveyed to the receiver by the transmitter in previous radio packets.

In embodiment 900, the spreading sequence may be computed by transmitter and receiver in dependence on information shared through cryptographic channel. The spreading sequence itself may not need to be transmitted in full, but some input information into the computation of the spreading sequence at the receiver may suffice, for example, a seed for a random number generator. In some embodiments a pseudo-random number generator may be used. Linear feedback shift registers (LFSR) or Linear congruential generators may be utilized to accomplish this, for example. Similarly, Mersenne twister, xorshift generators, steam ciphers, and block ciphers may also be used, for example. In that case, the transmitter may carry out the same computation as the receiver, or its inverse, in order to check which spreading input corresponds with which spreading sequence. The computation unit typically also implements data storage means to realize its function, and may use previous processing results as additional inputs into the computation.

A benefit of embodiment 900 over embodiment 700 may be that the transmission of the spreading input as part of the encrypted part of previous messages may be more compact that the transmission of a full spreading sequence itself. This may save airtime and power for communication. It is also possible that a single spreading input may be used to provide a spreading sequence that extends over a number of packets.

Figure 10:
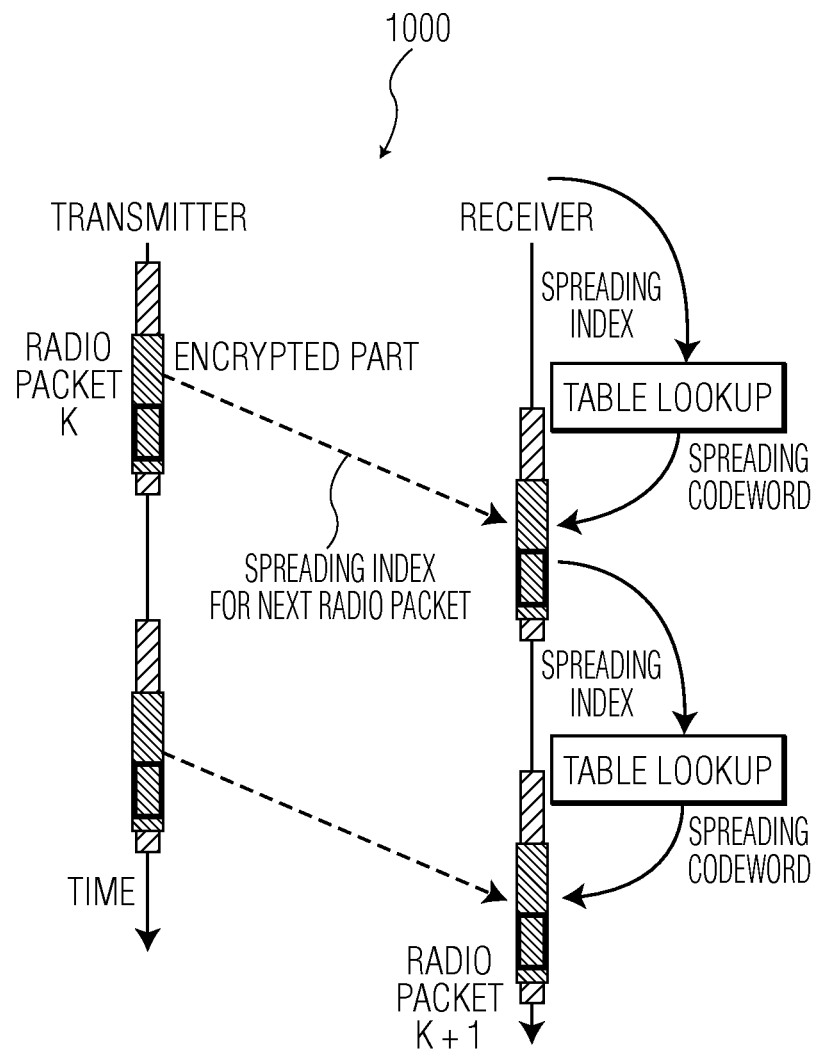
FIG. 10 illustrates an embodiment using a table lookup.

FIG. 10 illustrates an embodiment using a table lookup 1000. In embodiment 1000 the transmitter and receiver may store a table of allowed spreading sequences. The choice of the spreading sequence for one or more subsequent radio packets may be conveyed through an index in the table.

A spreading sequence may be chosen from a table by the transmitter and receiver in dependence on information shared through cryptographic channel. Further, the computation unit may be replaced by a table lookup unit. Such a scheme may allow a transmitter and receiver to agree on a set of allowed spreading sequences that, for example, have favorable spectral properties. In embodiment 1000, what is called "spreading input" in embodiment 900 may become an index in a lookup table that is stored at both transmitter and receiver. In this way it is guaranteed that only allowed spreading sequences may occur on the radio channel or sequences that suit particular use cases out of multiple use cases addressed by the transceiver pair.

Figure 11:
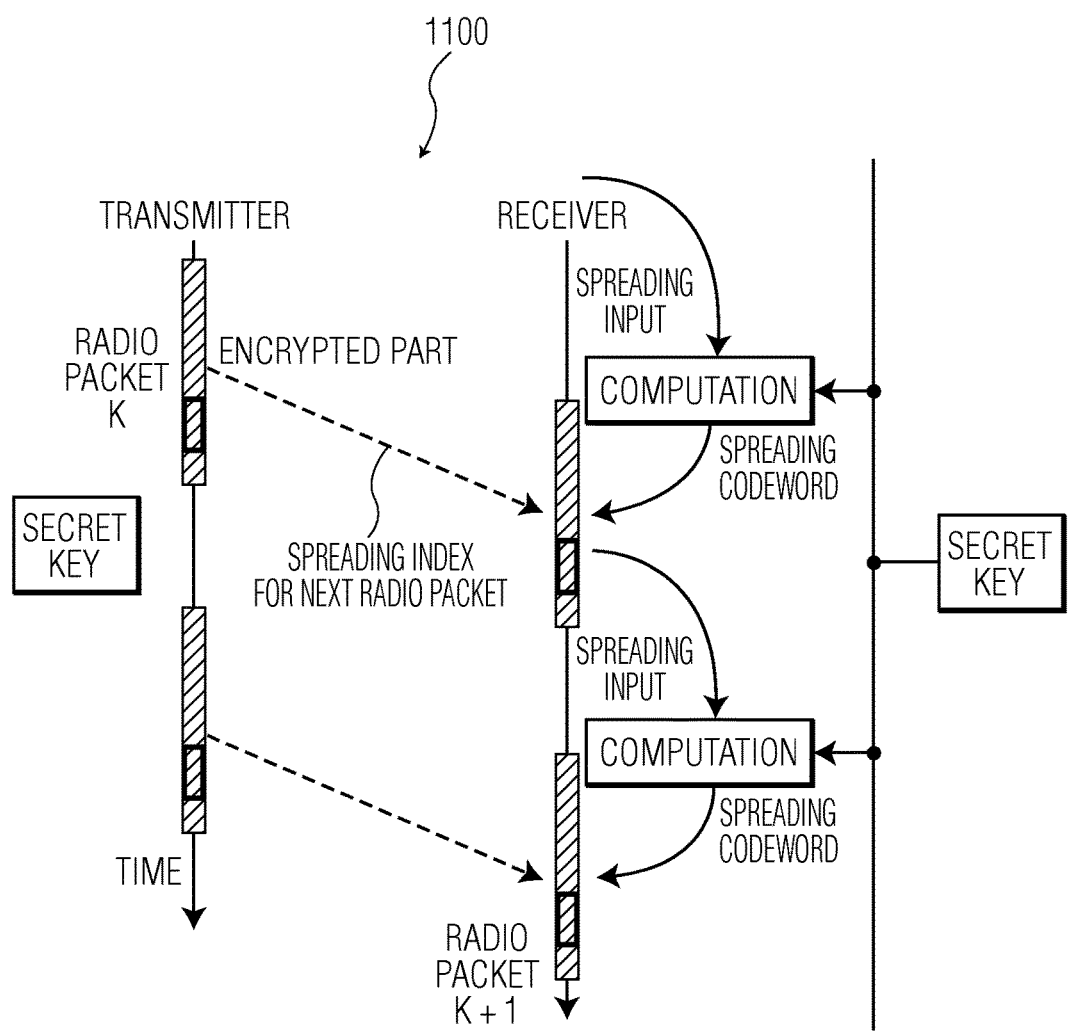
FIG. 11 illustrates an embodiment using a secret key.

In further embodiments, the table of allowed spreading sequences may be stored in a compressed form. This way, the amount of read only or random access memory that needs to be implemented for making the ranging system more secure may be limited. FIG. 11 illustrates an embodiment using a secret key 1100. In embodiment 1100 when the transmitter and receiver share a secret key, they may derive the secret spreading sequence from this key information and input information that is transmitted in the clear. The spreading sequence may be derived in dependence on secret key information shared between transmitter and receiver, and information shared by means of an auxiliary channel.

An amount of secure data storage may be available at both transmitter and receiver, and a common secret key may be programmed into this storage after the manufacturing of the transmitter and receiver apparatus. In that case, this common secret information may be used to aid in the creation of a common, shared sequence of spreading sequences, such as in embodiment 1100. In that case, the need to communicate the inputs to the computation of the spreading sequences by means of a cryptographically secured part of the existing communication channel may be relaxed, and these inputs may be transmitted in the clear.

Inputs to the computations of the spreading sequences may be transmitted by means of some other bidirectional communication channel than the UWB communication channel that is present between the transmitter and the receiver. This may decrease the likelihood that an attacker may be able to produce a suitable eavesdropping apparatus. In another embodiment, this input information may be derived from a broadcast channel that is commonly available at the transmitter and receiver in a near time synchronous fashion. GPS location, sound pressure level, or light intensity may be relevant at this point.

Figure 12:
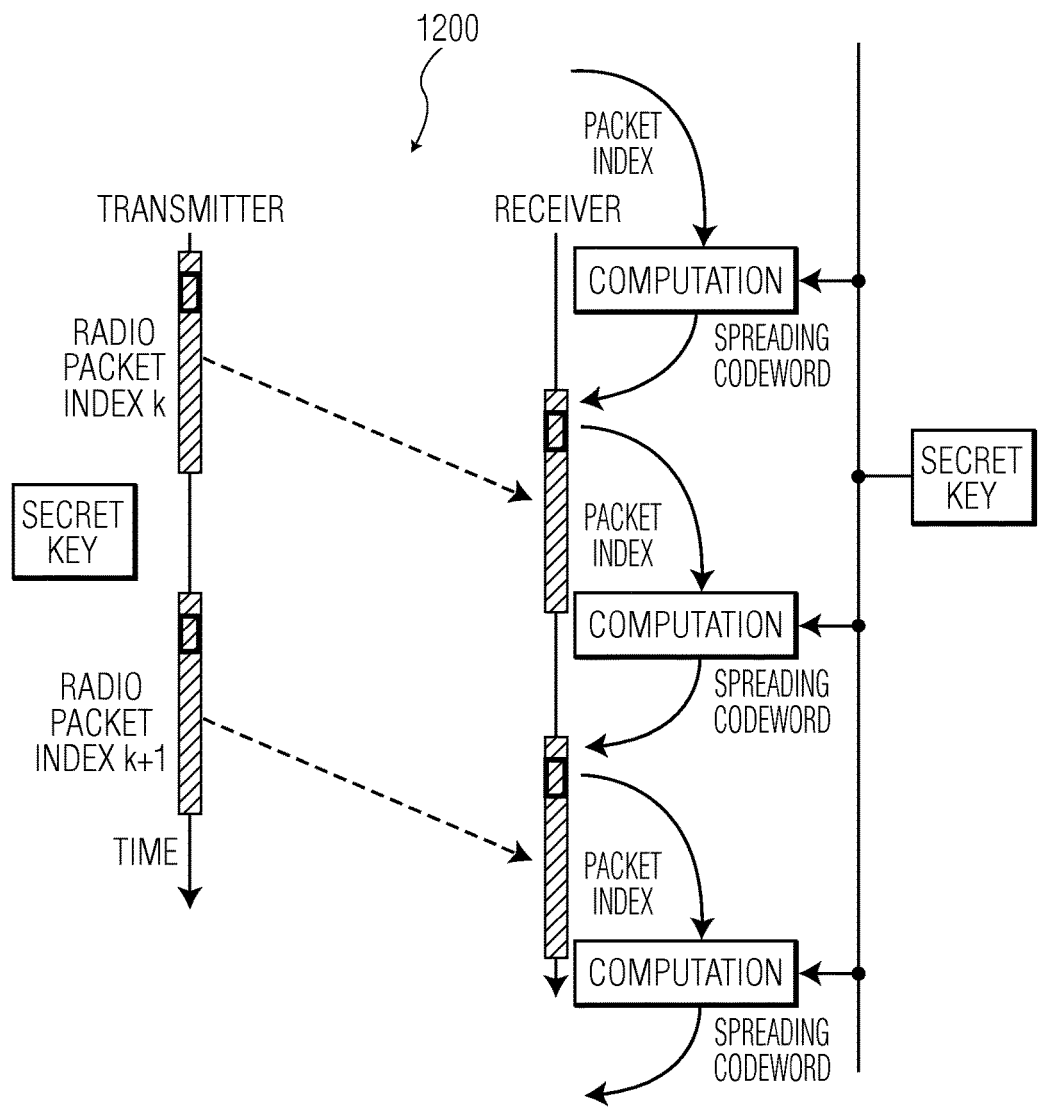
FIG. 12 illustrates an embodiment using a secret key in conjunction with a packet index.

FIG. 12 illustrates an embodiment using a secret key in conjunction with a packet index 1200. In embodiment 1200 the spreading codeword may be determined by the shared secret key of transmitter and receiver and the radio packet index.

A spreading sequence may be derived in dependence on secret key information shared between transmitter and receiver, and a counter. A particular choice of the counter information to derive time-varying spreading sequence from common secret key information stored in secure data storage and information available in the clear is to derive the spreading codeword, or the choice of the spreading codeword from a set of allowed spreading codewords from this secret key information and the radio packet index or one of the other communication data structure indexes.

Figure 13:
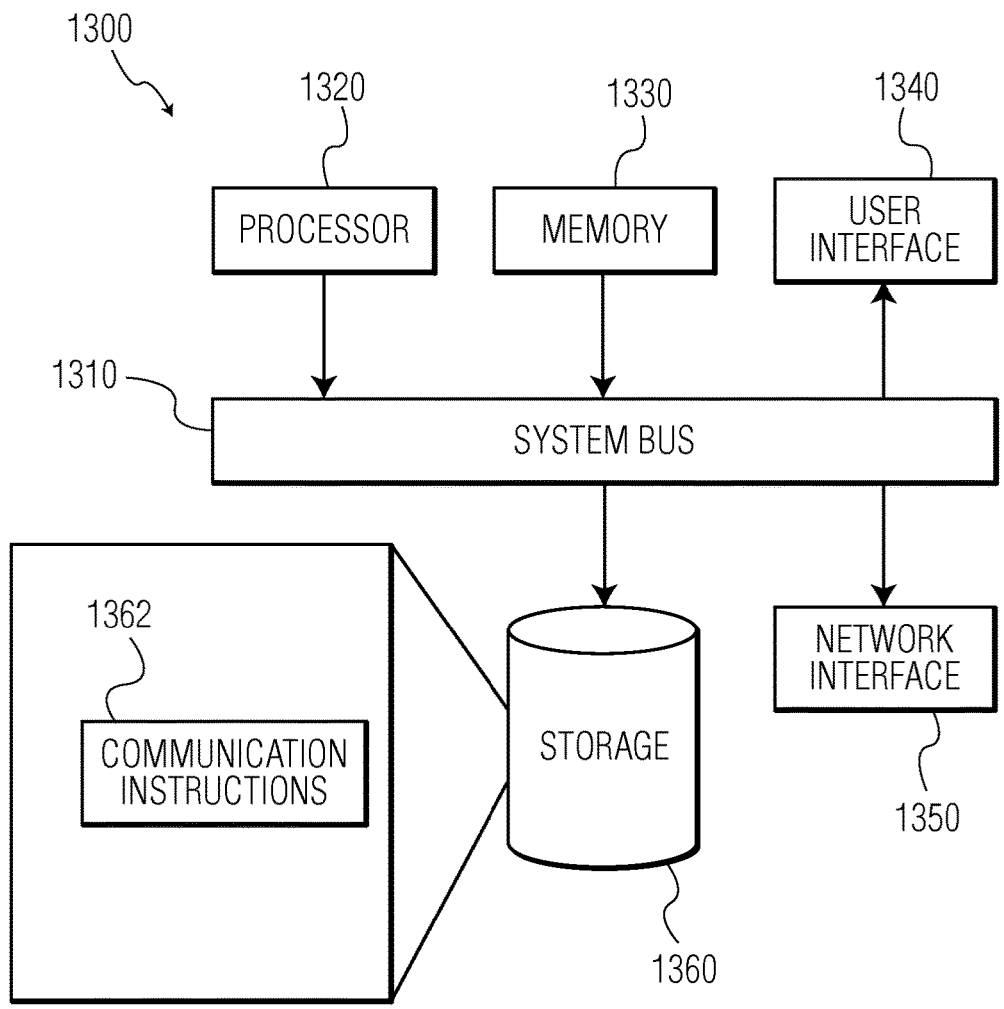
FIG. 13 illustrates an example of a hardware system.

FIG. 13 illustrates an example of a hardware system 1300 for implementing the coding and communication schemes described herein. The hardware system 1300 may correspond to virtually any device that may participate in a coding scheme such as, for example, a mobile communications device, server, smart card, near field communication (NFC) device, microcontroller, transmitter, receiver, or other device.

As shown, the device 1300 includes a processor 1320, memory 1330, user interface 1340, network interface 1350, and storage 1360 interconnected via one or more system buses 1310. It will be understood that FIG. 13 constitutes, in some respects, an abstraction and that the actual organization of the components of the device 1300 may be more complex than illustrated.

The processor 1320 may be any hardware device capable of executing instructions stored in the memory 1330 or the storage 1360. As such, the processor may include a microprocessor, field programmable gate array (FPGA), application-specific integrated circuit (ASIC), or other similar devices.

The memory 1330 may include various memories such as, for example L13, L2, or L3 cache or system memory. As such, the memory 1330 may include static random access memory (SRAM), dynamic RAM (DRAM), flash memory, read only memory (ROM), or other similar memory devices.

The user interface 1340 may include one or more devices for enabling communication with a user such as an administrator. For example, the user interface 1340 may include access to a display, a mouse, and a keyboard for receiving user commands. In some embodiments, the user interface 1340 may include a command line interface or graphical user interface that may be presented to a remote device via the network interface 1350.

The network interface 1350 may include one or more devices for enabling communication with other hardware devices. For example, the network interface 1350 may include a network interface card (NIC) configured to communicate according to the Ethernet or Bluetooth protocol, or a wireless protocol such as CDMA, TDMA or FDMA. Additionally, the network interface 1350 may implement a TCP/IP stack for communication according to the TCP/IP protocols, for example. Various alternative or additional hardware or configurations for the network interface 1350 will be apparent.

The storage 1360 may include one or more machine-readable storage media such as read-only memory (ROM), random-access memory (RAM), magnetic disk storage media, optical storage media, flash-memory devices, or similar storage media. In various embodiments, the storage 1360 may store instructions for execution by the processor 1320 or data upon which the processor 1320 may operate.

It will be apparent that various information described as stored in the storage 1360, may be additionally or alternatively stored in the memory 1330. In this respect, the memory 1330 may also be considered to constitute a "storage device" and the storage 1360 may be considered a "memory." Various other arrangements will be apparent. Further, the memory 1330 and storage 1360 may both be considered to be "non-transitory machine-readable media." As used herein, the term "non-transitory" will be understood to exclude transitory signals but to include all forms of storage, including both volatile and non-volatile memories.

In some embodiments, storage 1360 may contain communication instructions 1362, for example. Communication instructions may include instructions related to transmitting and/or receiving various codes. The instructions may be related to the relevant protocol used to transmit or receive.

While the hardware device 1300 is shown as including one of each described component, the various components may be duplicated in various embodiments. For example, the processor 1320 may include multiple microprocessors that are configured to independently execute the methods described herein or are configured to perform steps or subroutines of the methods described herein such that the multiple processors cooperate to achieve the functionality described herein. Various additional arrangements will be apparent.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A transmitter for communicating, the transmitter comprising:
   a memory;
   a processor in communication with the memory, the processor configured to:
   create information to be used by a receiver to define a spreading sequence for a subsequent packet in a transmission channel;
   code the information into a current communications packet in the transmission channel; and
   transmit the current communications packet.

2. The transmitter of claim 1 wherein, the spreading sequence to be used for the reception of a next radio packet is contained in an encrypted part of the current communications packet.

3. The transmitter of claim 1 wherein the spreading sequence is communicated between transmitter and receiver through a cryptographic channel and varied per radio packet.

4. The transmitter of claim 1 wherein the processor is further configured to transmit two spreading sequences with the current communications packet.

5. The transmitter of claim 1 wherein the spreading sequence is computed by the receiver in dependence on information shared through a cryptographic channel with the transmitter.

6. The transmitter of claim 1 wherein the processor is further configured to store the same table of allowed spreading sequences at the transmitter and the receiver.

7. The transmitter of claim 1 wherein the processor is further configured to transmit information through a cryptographic channel to be used by a receiver, wherein the receiver uses the transmitted information as an index in a lookup table to determine a spreading codeword.

8. The transmitter of claim 1 wherein the processor is further configured to use a secret key at the receiver to derive the spreading sequence, where the secret key is one that is shared with the transmitter.

9. The transmitter of claim 1 wherein the processor is further configured to derive the spreading sequence in dependence on secret key information shared between the transmitter and a receiver, as well as a counter.

10. A receiver for communicating, the receiver comprising:
    a memory;
    a processor in communication with the memory, the processor configured to:
    receive a current communications packet in a communication channel;
    decode information, created by a transmitter, in the current communications packet; and
    identify in the information a definition of a spreading sequence for a subsequent packet in the communication channel.

11. The receiver of claim 10 wherein, the spreading sequence to be used for a next radio packet is contained in an encrypted part of the current communications packet.

12. The receiver of claim 10 wherein the spreading sequence is communicated between transmitter and receiver through a cryptographic channel and varied per radio packet.

13. The receiver of claim 10 wherein the processor is further configured to receive two spreading sequences with the current communications packet.

14. The receiver of claim 10 wherein the spreading sequence is computed by the receiver in dependence on information shared through a cryptographic channel with the transmitter.

15. The receiver of claim 10 wherein the processor is further configured to store the same table of allowed spreading sequences at the transmitter and the receiver.

16. The receiver of claim 10 wherein the processor is further configured to receive information through a cryptographic channel transmitted by the transmitter, wherein the receiver uses the transmitted information as an index in a lookup table to determine a spreading codeword.

17. The receiver of claim 10 wherein the processor is further configured to use a secret key at the receiver to derive the spreading sequence, where the secret key is one that is shared with the transmitter.

18. The receiver of claim 10 wherein the processor is further configured to derive the spreading sequence in dependence on secret key information shared between the transmitter and the receiver, as well as a counter.

* * * * *